G. E. MARLATT.
PIG FEEDING APPARATUS FOR LINOTYPE MACHINES.
APPLICATION FILED SEPT. 17, 1913. RENEWED JUNE 17, 1916.
1,215,677.
Patented Feb. 13, 1917.
4 SHEETS—SHEET 1.
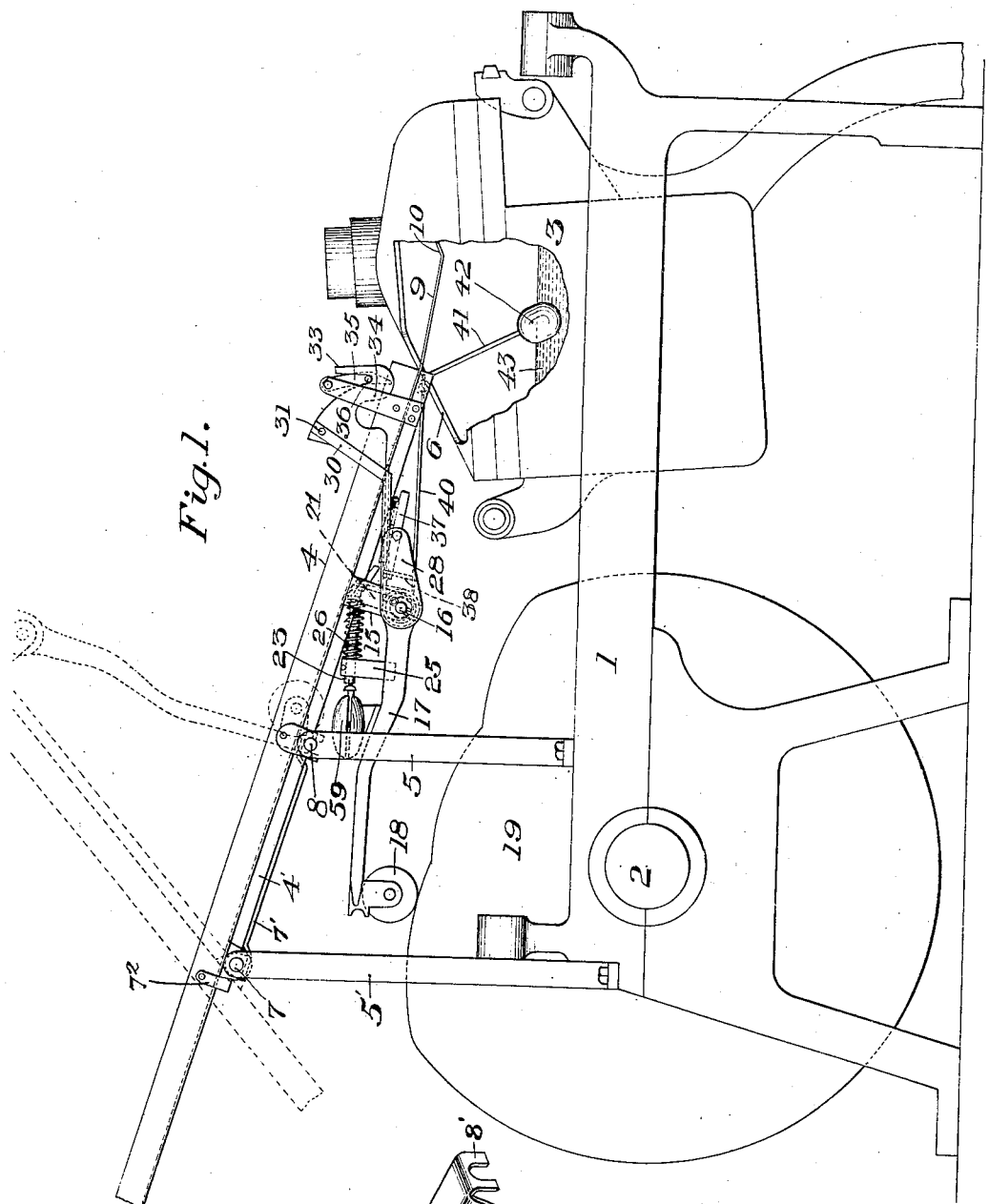
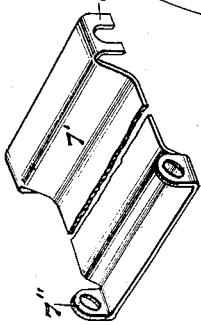
WITNESSES
INVENTOR
GEORGE E. MARLATT
By Luther L. Mack
His Attorney.

G. E. MARLATT.
PIG FEEDING APPARATUS FOR LINOTYPE MACHINES.
APPLICATION FILED SEPT. 17, 1913. RENEWED JUNE 17, 1916.
1,215,677.
Patented Feb. 13, 1917.
4 SHEETS—SHEET 2.
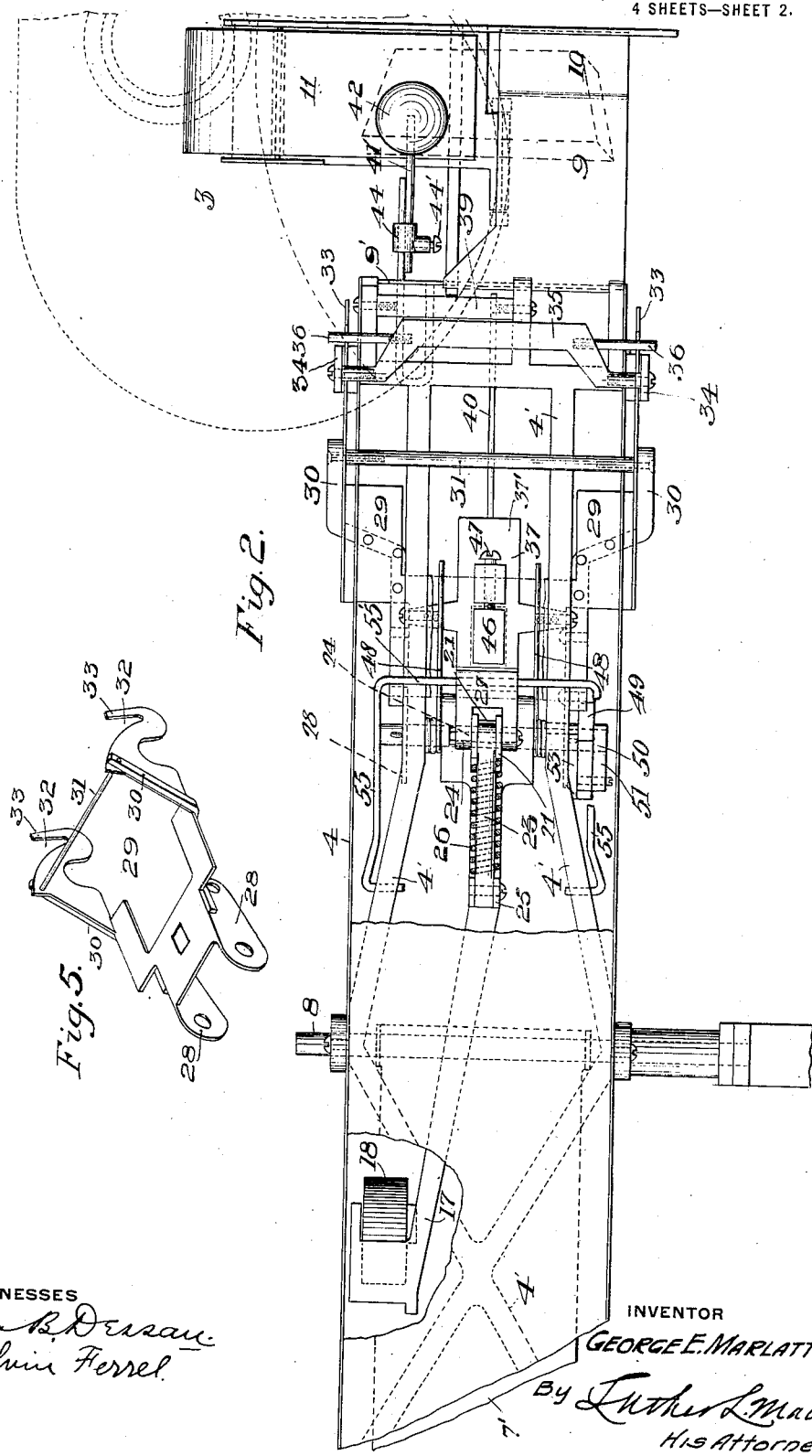
WITNESSES
Anna B. Dussau
Giba Alvin Ferrel
INVENTOR
GEORGE E. MARLATT
By Luther L. Mack
His Attorney.

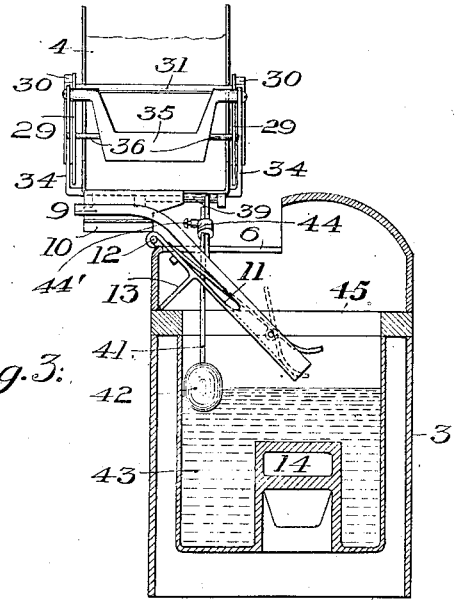
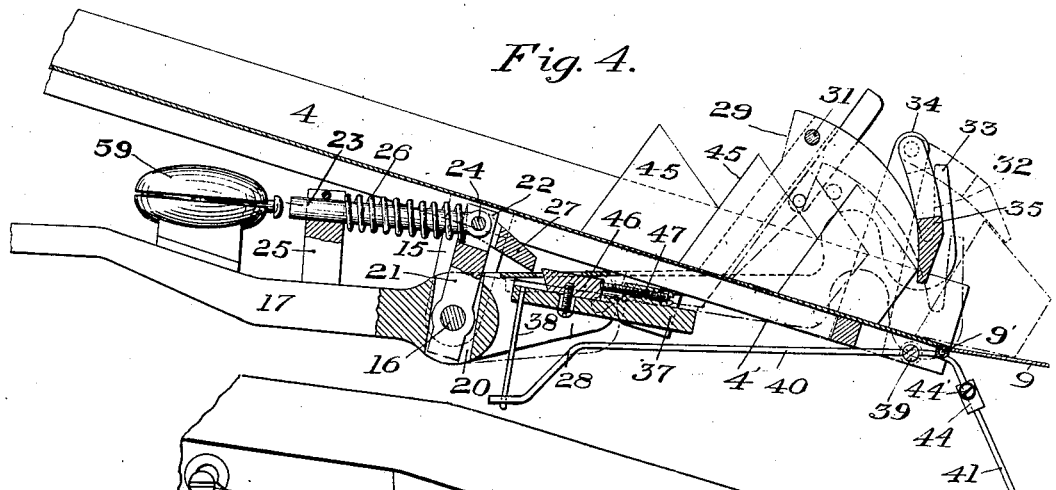
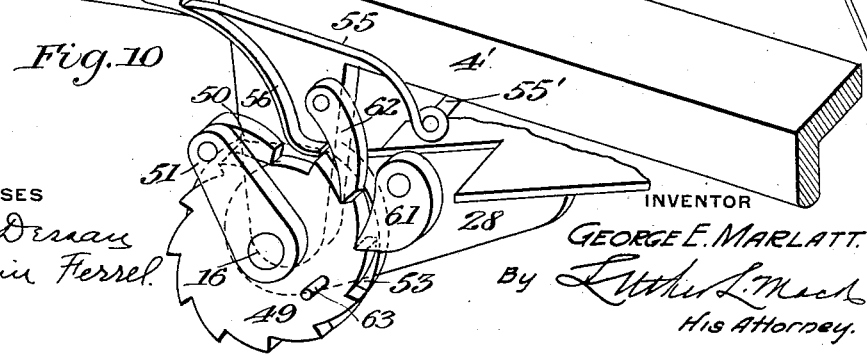

G. E. MARLATT.
PIG FEEDING APPARATUS FOR LINOTYPE MACHINES.
APPLICATION FILED SEPT. 17, 1913. RENEWED JUNE 17, 1916.
1,215,677.
Patented Feb. 13, 1917.
4 SHEETS—SHEET 4.
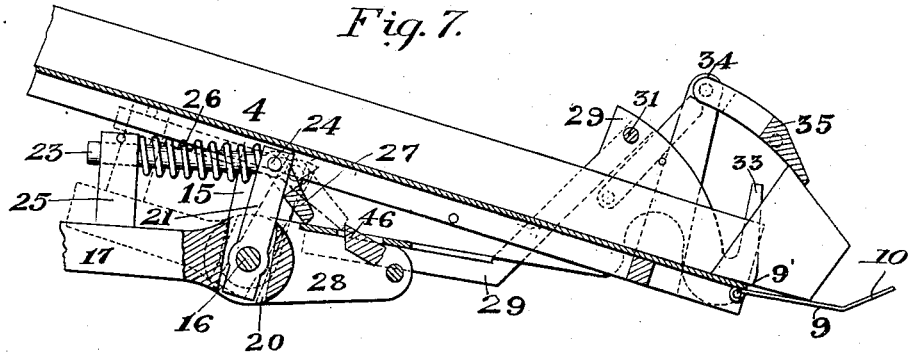
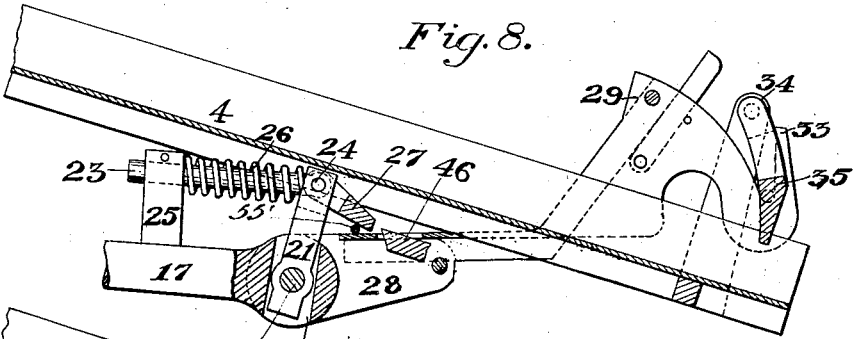
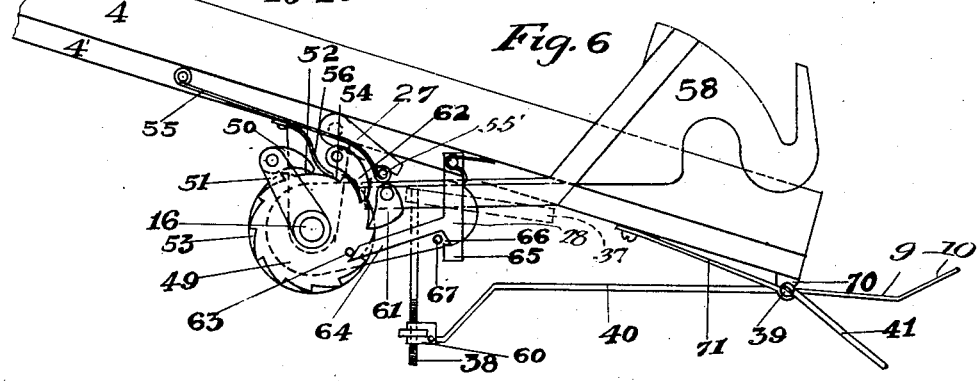
WITNESSES
INVENTOR
GEORGE E. MARLATT.
By
His Attorney.

UNITED STATES PATENT OFFICE.

GEORGE E. MARLATT, OF PASADENA, CALIFORNIA.

PIG-FEEDING APPARATUS FOR LINOTYPE-MACHINES.

1,215,677. Specification of Letters Patent. Patented Feb. 13, 1917.

Application filed September 17, 1913, Serial No. 790,367. Renewed June 17, 1916. Serial No. 104,235.

*To all whom it may concern:*

Be it known that I, GEORGE E. MARLATT, a citizen of the United States, residing at Pasadena, in the county of Los Angeles and State of California, have invented a new and useful Pig-Feeding Apparatus for Linotype-Machines, of which the following is a specification.

My invention relates to improvements in pig feeding apparatus for linotype machines, and the object of my invention is to provide an apparatus of this character which will without fail feed a pig to the melting pot when the level of the molten type metal in the pot descends below a predetermined point. Another object is to provide means whereby the pig feeding apparatus may be removed from the inlet of the pot in a minimum of time and at such a distance therefrom and into such a position relative to the pot that unobstructed access may be had to the pot for skimming or other purposes. Other objects will appear in the subjoined detailed description.
I attain these objects by means of the mechanism illustrated in the accompanying drawings, in which—

Figure 1 is a side elevation of my invention and of so much of a linotype machine as is essential to the understanding thereof, the melting-pot being partly broken away. Fig. 2 is a plan of Fig. 1. Fig. 3 is a vertical section through the melting-pot showing the chute in end elevation. Fig. 4 is a section of my invention taken longitudinally of the chute. Fig. 5 is a detail of the pig-releasing lever. Fig. 6 is a side elevation of the feed regulating mechanism to prevent the overflow of the crucible when an ingot is fed into it from the magazine with portions of the mechanism shown in Figs. 7 and 8 omitted for clarity; Fig. 7 is a sectional elevation through the center of the magazine when the stop is open; Fig. 8 is a similar section to Fig. 7 when the stop is closed; Fig. 9 is a perspective view of the leg spacing plate 7'; Fig. 10 is a perspective of a portion of the feed regulating mechanism shown in Fig. 6.
On the drawings, 1 represents a frame, in which the horizontal rotary shaft 2 is supported, and 3 is the melting-pot.

The magazine 4, supported on the legs 5 and 5' which are secured to the frame 1, is inclined downwardly toward the melting-pot and has its lower end within the top-opening 6 in the pot or sufficiently near thereto so that pigs sliding down the magazine may, when released, be deposited within the pot. The magazine is supported so as to swing on the pivot or shaft 7 supported on the legs 5' above the rear end of the frame 1. The magazine is supported between the pot and the pivot 7 on the horizontal rod 8 which is held by the legs 5. The leg spacing plate 7' has the upturned perforated ears 7'' adapted to pivot on the shaft 7 at one end at the other end the downwardly projecting slotted ears 8' adapted to engage and hook over the rod 8, this plate being interposed between the legs 5 and 5' and below the spider 4'. I have shown the main part of the magazine terminating at the opening 6 in the pot. The bottom of the magazine is prolonged by the pivoted apron 9 which is narrower than the bottom of the magazine and lies at the side of the opening 6. This apron, which is pivoted on the rod 9' on the spider 4', terminates in an inclined flange 10 which limits the movement of the pigs to a point where they are intended to fall by gravity into the pot and the apron being so narrow that it will support a pig sliding on the same only on less than half the width of a pig. Consequently, the pig will tilt on the edge of the apron and fall into the melting-pot.

The pigs preferably do not fall from the apron of the magazine directly into the molten type-metal but upon the supplemental inclined chute 11 which is hung on the pin 12 at the upper outer edge of the opening 6, at right angles to the magazine 4 and provided with the brace or leg 13 seated against the inner surface of the pot or otherwise so as to hold the chute in the inclination desired. The pigs slide on the chute 11 to the side of the pot opposite the apron 9 and thence into the molten metal, on top of the throat 14. The chute 11 traveling with the pot prevents the wedging of a pig between the end thereof and the side of the pot, as would be the case if the chute 11 were movable with the magazine 5. 10

The magazine 4 is composed of a sheet metal trough resting on a cast iron spider 4', to which the various parts associated with the magazine are secured.

14 represents the usual throat through which the molten metal passes on its way to the matrices.

The hanger 15, cast with the spider 4', depends from the bottom of the magazine 4 and supports the pin 16, on which the lever 17 is pivotally mounted. The rear end of this lever is provided with the roller 18, which rides on the periphery of the cam 19 fastened to the shaft 2. The end of the lever 17 about the pin 16 is provided with the slot 20, in which stands the oscillatory pawl-carrier 21, pivoted on the said pin. The upper end of the carrier 21 has the slot 22, in which the rod 23 is seated, the pin 24 passing through both the carrier and the rod. The rear end of the rod 23 is slidingly held in an opening on the lug or bearing block 25 on the upper side of the lever 17. A coiled expansion spring 26 surrounds the rod 23 between the lever 21 and the lug 25.

The forwardly projecting dog or pawl 27 is provided with arms which are mounted on the pin 24 and embrace the sides of the lever 21.

The pin 16 supports the two arms 28 of the oscillatory releasing lever 29, to which is secured the arms 30 extending up above the magazine 4 at each side thereof. These arms are connected together by the horizontal bar 31 which lies over the magazine. The lever 29 carries forward extensions, having the slots 32 opening upwardly and the releasing fingers 33.

The spider 4' carries the two uprights or standards 34, pivotally supporting at their upper ends the lip or stop 35 which normally has its lower end in the path of the lowest pigs in the chute 11. A pin 36 is secured in each side of the stop 35, the ends of the pins resting normally in the slots 32, from which the pins are prevented from escaping by means of the fingers 33 forming one side of the slots.

The arms 28 pivotally support between them the block 37, and have the depending rod 38 secured thereto. The forward end of the spider 4' supports the rock shaft 39 having secured thereto the rear arm 40 which lies within the loop 38 and the front arm 41 which projects into the pot 3 and supports at its outer end the float 42 resting on the surface of the molten typemetal 43. Preferably the arm 41 will be adjustable as by the sleeve 44 and setscrews 44', as shown on Figs. 2, 3, and 4.

The magazine with all the parts supported by it may be raised to the dotted position (Fig. 1) and held thereby, the concave rear end of the lever 17 being seated on the bar 8. The supplemental chute 11, if used, may be readily removed from the pot by unhooking it from the rod 12. The pot is then entirely unobstructed for the skimming of the molten metal therein.

The block 37 carries on its upper side the catch block 46 lying slightly in advance of the rearmost position of the pawl 27 and is adjustable in the block 37 by means of the screw 47. Springs 48 normally hold the lever 29 and the rod 31 in the positions shown in full lines on Fig. 1.

The parts being as shown in full lines on all the drawings, the pigs 45, shown in full lines on Fig. 4, will be prevented from sliding down the chute by reason of the lowest pig being in engagement with the stop 35, which cannot swing to the right because the pins 36 are held in the slots 32 at the rear side of the fingers 33. The shaft 2, which is a part of the linotype mechanism and is running when the mechanism is used, causes the rotation of the cam 19. This cam causes the lever 17 to oscillate and throw the pawl 27 forward. As the catch-block 46 is in the path of the pawl 27, the upwardly projecting arms 30 on the lever 29 will be thrown down to the dotted position shown on Fig. 4. As soon as the fingers 33 pass below the pins 36, the leading pig pushes up the stop 35, as shown in Fig. 4, and passes onto the apron 9 and thence into the pot, as before explained. At the same time the cross-bar 31 moves down into the path of the succeeding pig, as shown in dotted lines on Fig. 4, and prevents its descent until the pawl 27 retires and permits the bar 31 to rise. As soon as the released pig passes beyond the stop 35, the latter drops into its normal position with the pins 36 over the slots 32. As soon as the bar 31 rises to release the obstructed pig, the latter slides down the chute until it engages the stop 35, which has been again locked by the fingers 33. The pigs at the rear of the pigs described follow the released pig in a step by step manner as will be readily understood.

The catch-block 46 stands in the path of the reciprocating pawl 27 only when the metal in the pot is below a predetermined level. When the surface of the metal in the pot is at a predetermined high level, the float causes the arm 40 to be depressed, the latter acting on the block 37 to swing the catch-block 46 below the path of the pawl 27, but when the level of the molten metal sinks below a predetermined low level, the float permits the block 37 to be tilted by its heavier forward end 37', so as to bring the catch-block into the path of the said pawl. The block 46 may be adjusted by the screw 47 to cause the pawl to act earlier or later, as desired. The collar 44' and screw 45 permit the block to be actuated by any different level of the metal in the pot.

It is seen that I have provided in the pawl 27 and the block 46 a hit-and-miss device for connecting together the actuating means for my feeder, the said device being independent of the reciprocations of the pot and controlled by the level of the metal in the pot.

The spring 26 prevents the breakage of any of the parts of the machine in case anything should prevent the releasing lever 29 from yielding when the pawl 27 is in engagement with the catch-block 46 and is being urged forward by the cam 19.

In practice it has been found that the float 42 will not always immediately respond, in order to break the connection between the dog 27 and the catch block 46 after the feeding of an ingot, and as a result, at the next revolution of the drive shaft of a linotype machine, another ingot may prematurely follow. I provide therefore, an auxiliary mechanism as shown in Fig. 6, only, in order to insure the breaking of the connection aforesaid immediately upon the dropping of an ingot and to hold the dog 27 in a path above the contact end of the catch block 46, as shown in Fig. 4, for a sufficient length of time to permit an ingot to become immersed in the molten metal, and the withdrawal of the contact end of the catch block 46 out of the path of the dog 27 when it is lowered to normal position, the length of time the above elements are in said position is determined by the number of teeth in the ratchet wheel 49, the number of said teeth being considerably less than the number of slugs or lines of type obtained from a single ingot, so that the ratchet wheel 49 may make one complete revolution to restore the dog 27 to its lower or operative position and then rest until the float 42 permits the catch block 46 to again rise into the path of the dog 27, any further operation of the ratchet wheel being arrested by the omission of a tooth, as at 52.

The ratchet wheel 49 is revolubly mounted on the shaft 16, at the forward end thereof, and adapted to advance one tooth at each revolution of the main cam shaft of a linotype machine, by the engagement therewith of a pawl 50 which is pivotally mounted at the end of a pawl lever 51 secured to the shaft 16 at the outside of the ratchet wheel 49.

The dog 27 is raised and lowered by a wire 55' as shown in Figs. 2, 6 and 8, the outer ends 55 of the wire being pivoted on the spider 4'. A disk 53 is secured to the rear side of the ratchet wheel 49 and has a radial depression 54 on its edge and opposite that portion of the ratchet wheel where the tooth is omitted. The outer end of the wire 55 has a flat spring rider 56 secured to it and it is adapted to engage the periphery of the disk 53, so that when the rider 56 is in engagement with the concentric outer edge of the disk, the dog 27 and the catch block 46 will be separated, but when the rider engages the depression 54 in the edge thereof, in the event that the metal in the pot has become sufficiently low, the dog and the catch block may engage, as before described. When in the latter position a pawl 61 pivoted to the carriage 58 is caused to move the ratchet one tooth forward by the tilting of the carriage and the rider 56 will engage the concentric edge of the disk 53. Upon the restoration of the carriage 58 the disk is prevented from a backward movement by the pawl 62 pivoted to the frame of the feeder. One tooth or point in advance of the arresting of the movement of the ratchet wheel, a pin 63 in the side of the ratchet engages the end of the arm 64 of a latch pivoted to the spider 4' and causes the lower end 65 of the latch which has a notch 66 to disengage a pin 67 in the side of the carriage, thus leaving the carriage free to be tilted.

This last operation of the ratchet can not take place unless the dog 27 is free to pass at least once over the dog 46 without engaging it. In the event of such engagement taking place before the latch 65 has disengaged the pin 67, the spring 26 will be compressed and the spring rod 23 on which the spring is mounted may serve to either sound a bell 59, or otherwise notify the operator that the ingot previously dropped has for some reason failed to raise the float.

As an adjustment means for controlling the metal in the crucible I may provide a thread on the rod 38 as shown in Fig. 6 and loosely place on this rod the yoke bracket 60, the thumb nut being screwed on the rod between the arms of the yoke and the rod 40 being pivoted to the bracket 60.

When the crucible swings forward to casting position, in order to prevent damage to the feeder in case the metal has become solidified, I may provide a snap bearing for the pivot screw 39 as shown in Fig. 6, the bearing consisting of a lug cast on the frame as at 70 and adapted to form the upper half of the bearing, and a flat spring piece 21 secured at one end to the spider 4' and at the other bent to form the under side of the bearing. Thus when the crucible moves forward the rod 40 and the float rod 41 will pull out of the bearing.

The adjusting mechanism and the snap bearing described above are not shown in any of the figures of the drawing but Fig. 6 for purpose of clearly illustrating the other parts.

I do not limit myself to the details and combinations shown and described except where specifically claimed.

I claim:

1. In a pig-feeding mechanism for linotype machines, a reciprocating melting-pot, a magazine for pigs, a supplemental laterally inclined chute arranged within the pot, independent of said magazine and at right angles thereto, and means independent of the reciprocations of the pot and controlled by the level of the molten metal in the pot for feeding the pigs intermittently from the said magazine into the said pot.

2. In a pig-feeding mechanism for linotype machines, a reciprocating pot, a magazine for pigs, a supplemental laterally inclined chute arranged within the pot, independent of said magazine and at right angles thereto, and a hit-and-miss device independent of the reciprocations of the pot and controlled by the level of the molten metal in the pot for feeding the pigs intermittently from the said magazine into the said pot.

3. In a pig-feeding mechanism for linotype machines, a reciprocating pot, a magazine for pigs, a supplemental laterally inclined chute arranged within the pot, independent of said magazine and at right angles thereto, and a hit-and-miss device independent of the reciprocation of the pot and controlled by the level of the molten metal in the pot for feeding the pigs intermittently from the said magazine into the said pot, one element of said device being actuated by the linotype machine and the other intermittently by the level of the metal in the pot.

4. In a pig-feeding mechanism for linotype machines, a melting-pot, a magazine for pigs, movable means for retaining the pigs in the magazine, a reciprocating element, and a second element controlled by the level of the metal in the pot for operatively connecting said reciprocating element to said retaining means when the said metal is below a predetermined level.

5. In a pig-feeding mechanism for linotype machines, a melting pot, a magazine for pigs, a cam shaft, a dog reciprocated thereby, a float in the pot, a catch controlled by the float to cause the former to come into the path of the dog when the float is below a predetermined level and to be out of the path of the dog when the float is above said level, and means connected with said block for releasing a pig from the magazine.

6. In a pig-feeding mechanism for linotype machines, a melting pot, a magazine for pigs, a float arranged to control the delivery of the pigs from the magazine, and means for adjusting the float to cause it to control the said delivery at any of several levels of the metal in the pot.

7. In a pig-feeding mechanism for linotype machines, a pot having a top opening therein, and a magazine leading to the same and terminating at the side of said top opening, the terminal portion being of such a width as to support less than half the weight of a pig, whereby the latter will be tilted by gravity from the said terminal portion into the pot.

8. In a pig feeding mechanism for linotype machines, a pot having a top opening therein, a magazine leading to the same and terminating at the side of said top opening, the terminal portion being of such a width as to support less than half the weight of a pig, whereby the latter will be tilted by gravity from the said terminal portion into the pot, and a chute carried by the pot and within the same.

9. In a pig feeding mechanism for linotype machines, a pot, a pivotally supported magazine leading to and opening in the pot, a pig feeding mechanism supported by the magazine, and a cam lever for actuating said feeding mechanism, said lever adapted to serve as a support for the magazine when moved on its pivot away from the said opening in the pot.

10. In a pig feeding mechanism for linotype machines, the combination of a pot, a magazine for pigs, a mechanism including a float suspended from the magazine arranged within and adapted to move with the pot for feeding the pigs thereto; and a laterally inclined supplemental chute arranged within the pot, independent of said magazine and at right angles thereto, as described.

11. In a pig feeding mechanism for linotype machines, a pot, a magazine, a power actuated element, a mechanism for feeding the pigs intermittently from the magazine, a float suspended therefrom and a yieldable safety device for the pig feeding mechanism independent of the pot.

12. In a pig feeding mechanism for linotype machines, the combination with a magazine and a crucible, of means secured to the magazine frame adapted to insure the action of a float in the crucible and to so regulate and time the dropping of the ingots into the crucible as to prevent the overflow of the metal therein.

13. In a pig feeding mechanism for linotype machines, the combination with a crucible, a magazine and means for preventing the overflow of the metal in the crucible, of a float in the crucible and an adjusting means connected with said float whereby the desired level of the metal in the crucible at which an ingot will be dropped from the magazine may be predetermined and established.

14. In a pig feeding mechanism for linotype machines, the combination of a magazine for containing a number of ingots, a crucible for melting said ingots, means for intermittently feeding said ingots singly from the magazine to the crucible, a float adapted to float on the surface of the molten metal, means for preventing the premature dropping of an ingot into the crucible and the overflow of the metal therein, and means for adjusting the normal position of said float to regulate and time the dropping of the ingots.

15. In a pig feeding mechanism for linotype machines, the combination with a magazine, ingots in said magazine, a crucible, means for intermittently dropping the ingots from the magazine to the crucible, means for preventing the overflow of metal in the crucible, and means for adjustably regulating the point at which the ingots will drop into the crucible, of means secured to the magazine frame for preventing the breaking or strain of the float controlling mechanism when the metal in the crucible has become solidified.

GEORGE E. MARLATT.

Witnesses:
J. D. HASKIN,
ANNA B. DESSAU.